US009939798B2

(12) United States Patent
Haga et al.

(10) Patent No.: US 9,939,798 B2
(45) Date of Patent: Apr. 10, 2018

(54) NUMERICAL CONTROLLER HAVING CUTTING IN/OUT MOTION INSERTING FUNCTION OR CIRCULAR MOTION INSERTING FUNCTION

(71) Applicant: FANUC Corporation, Minamitsuru-gun, Yamanashi (JP)

(72) Inventors: Makoto Haga, Minamitsuru-gun (JP); Masaaki Shindou, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 208 days.

(21) Appl. No.: 14/722,677

(22) Filed: May 27, 2015

(65) Prior Publication Data
US 2015/0346707 A1 Dec. 3, 2015

(30) Foreign Application Priority Data

May 28, 2014 (JP) ................................ 2014-110232

(51) Int. Cl.
*G06F 19/00* (2011.01)
*G05B 19/18* (2006.01)

(52) U.S. Cl.
CPC .. *G05B 19/182* (2013.01); *G05B 2219/36204* (2013.01); *G05B 2219/49047* (2013.01); *G05B 2219/49049* (2013.01)

(58) Field of Classification Search
CPC .................... G05B 19/182; G05B 2219/36204
USPC ......................................................... 700/160
See application file for complete search history.

(56) References Cited

U.S. PATENT DOCUMENTS 5,019,115 A    5/1991  Schneider et al.
8,240,234 B2 * 8/2012  Woody ...................... B23B 1/00
                                                        82/1.11
2004/0223822 A1* 11/2004 Brosset ................ B23D 77/042
                                                        408/158

(Continued)

FOREIGN PATENT DOCUMENTS

CN    102626886 A    8/2012
JP    S58-117007 A   7/1983

(Continued)

OTHER PUBLICATIONS

Notification of Reasons for Refusal dated Oct. 27, 2015 in Japanese Patent Application No. 2014-110232 (3 pages) with an English Translation (5 pages).

(Continued)

*Primary Examiner* — Ziaul Karim
(74) *Attorney, Agent, or Firm* — Drinker Biddle & Reath LLP

(57) ABSTRACT

Disclosed is a numerical controller that has a cutting in/out motion inserting function and configured to control a machine tool that performs lathe-turning machining in which a cutting tool moves in contact with a rotating workpiece. The numerical controller includes a cutting in/out motion inserting unit that generates a program to perform cutting in/out motion, based on operation conditions analyzed by a cutting in/out motion operation conditions analysis unit and inserts the generated program of performing the cutting in/out motion to a program to perform the lathe-turning machining.

3 Claims, 18 Drawing Sheets

(56) References Cited

U.S. PATENT DOCUMENTS

| | | | | |
|---|---|---|---|---|
| 2005/0172764 | A1* | 8/2005 | Fagan | B23K 7/105 83/13 |
| 2007/0091094 | A1* | 4/2007 | Hong | G05B 19/41 345/474 |
| 2007/0191982 | A1* | 8/2007 | Sullivan | G05B 19/4093 700/182 |
| 2007/0250206 | A1* | 10/2007 | Otsuki | G05B 19/4103 700/189 |
| 2011/0299949 | A1* | 12/2011 | Ebihara | B23B 1/00 409/84 |
| 2012/0271446 | A1* | 10/2012 | Sato | G05B 19/4166 700/108 |
| 2012/0296462 | A1* | 11/2012 | Otsuki | G05B 19/4069 700/104 |
| 2014/0102268 | A1 | 4/2014 | Hariki et al. | |

FOREIGN PATENT DOCUMENTS

| | | |
|---|---|---|
| JP | S61-182705 A | 8/1986 |
| JP | S63-237842 A | 10/1988 |
| JP | H01-092001 A | 4/1989 |
| JP | H01-321138 A | 12/1989 |
| JP | H06-285701 A | 10/1994 |
| JP | H07-068401 A | 3/1995 |
| JP | H08-25182 A | 1/1996 |
| JP | 2002-292501 A | 10/2002 |
| JP | 2006-001008 A | 1/2006 |
| JP | 2008-068364 A | 3/2008 |
| JP | 2008-284688 A | 11/2008 |
| JP | 2009-190119 A | 8/2009 |
| JP | 2013-103279 A | 5/2013 |
| JP | 2014-054688 A | 3/2014 |

OTHER PUBLICATIONS

The Notification of the First Office Action dated May 2, 2017 in Chinese Patent Application No. 2015102801884 (7 pages) with an English translation (10 pages).

* cited by examiner

FIG. 6

```
MACHINING PROGRAM
O0001
N01 G00 X45.0 Z200.0 Y0.0;
N02 M03 S500
N03 G198 I10.0 R5.0 P3 F2.0 T5000 SB5 EB6;
N04 G01 G99 X50.0 F1.5;
N05 G01 G99 Z150.0 F1.5;
N06 G01 G99 Z100.0 F0.5;
N07 G01 G99 X45.0 Z80.0 F1.5;
N08 G01 G99 Z50.0 F1.5;
N09 G01 G99 X60.0 F1.5;
M30;
```

FIG. 12

```
MACHINING PROGRAM
O0002
N01 G00 X45.0 Z200.0 Y0.0;
N02 M03 S500
N03 G199 R5.0 G18 Q0 F2.0 T5000 SB5 EB6;
N04 G01 G99 X50.0 F1.5;
N05 G01 G99 Z150.0 F1.5;
N06 G01 G99 Z100.0 F0.5;
N07 G01 G99 X45.0 Z80.0 F1.5;
N08 G01 G99 Z50.0 F1.5;
N09 G01 G99 X60.0 F1.5;
M30;
```

MACHINING PROGRAM
O0003
N01 G00 X45.0 Z200.0 Y0.0;
N02 M03 S500
N03 G198 I10.0 R5.0 P3 F2.0 T5000 SB5 EB6;
N04 G01 G99 X50.0 F1.5;
N05 G01 G99 Z150.0 F1.5;
N06 G01 G99 Z100.0 F0.5;
N07 G01 G99 X45.0 Z80.0 F1.5;
N08 G01 G99 Z50.0 F1.5;
N09 G01 G99 X60.0 F1.5;
M30;

```
MACHINING PROGRAM
O0004
N01 G00 X45.0 Z200.0 Y0.0;
N02 M03 S500
N03 G199 R5.0 G18 Q0 F2.0 T5000 SB5 EB6;
N04 G01 G99 X50.0 F1.5;
N05 G01 G99 Z150.0 F1.5;
N06 G01 G99 Z100.0 F0.5;
N07 G01 G99 X45.0 Z80.0 F1.5;
N08 G01 G99 Z50.0 F1.5;
N09 G01 G99 X60.0 F1.5;
M30;
```

```
MACHINING PROGRAM
O0005
N01 G00 X60.0 Z200.0 Y0.0;
N02 M03 S500
N03 G198 I5.0 R5.0 P3 F2.0 T5000 SB5 EB5;
N04 G01 G99 X50.0 F1.5;
N05 G01 G99 Z100.0 F1.5;
N06 G01 G99 X55.0 F1.5;
N07 G01 G99 Z50.0 F1.5;
N08 G01 G99 X60.0 F1.5;
M30;
```

```
MACHINING PROGRAM
O0006
N01 G00 X60.0 Z200.0 Y0.0;
N02 M03 S500
N03 G199 R5.0 G18 Q0 F2.0 T5000 SB5 EB5;
N04 G01 G99 X50.0 F1.5;
N05 G01 G99 Z100.0 F1.5;
N06 G01 G99 X55.0 F1.5;
N07 G01 G99 Z50.0 F1.5;
N08 G01 G99 X60.0 F1.5;
M30;
```

NUMERICAL CONTROLLER HAVING CUTTING IN/OUT MOTION INSERTING FUNCTION OR CIRCULAR MOTION INSERTING FUNCTION

RELATED APPLICATION DATA

This application claims priority under 35 U.S.C. § 119 and/or § 365 to Japanese Application No. 2014-110232 filed May 28, 2014, the entire contents is incorporated herein by reference.

BACKGROUND OF THE INVENTION

1. Field of the Invention

The present invention relates to a numerical controller and, in particular, to a numerical controller having a cutting in/out motion inserting function or a circular motion inserting function for an improvement in the separation of chips and the efficient circulation of a coolant.

2. Description of the Related Art

In known lathe-turning machining, a workpiece is cut in one direction with a cutting tool. Therefore, chips resulting from the machining are continuously generated without being separated as the cutting tool moves. If the machining is continuously operated with the chips remaining, the chips come in contact with the workpiece, which results in damage on the workpiece.

In addition, the cutting tool comes in contact with the workpiece at all times during the machining, and thus a coolant does not efficiently circulate between the cutting tool and the workpiece. This results in reduction in the service life of the cutting tool due to friction and reduction in machining accuracy caused when the blade tip of the cutting tool deforms due to heating.

In order to address the above problems in the related art, various methods have been proposed. For example, Japanese Patent Application Laid-open No. 2013-103279 describes a machine tool in which a numerical controller vibrates a workpiece as a machining target, a cutting tool for machining, or both the workpiece and the cutting tool with low frequency in at least a biaxial direction to achieve the separation of chips and the circulation of a coolant. Further, Japanese Patent Application Laid-open No. H06-285701 describes a machine tool in which a numerical controller executes the forward movement, the suspension, and the reverse movement of lathe-turning machining at any timing to prevent the continuous generation of chips. Furthermore, each of Japanese Patent Application Laid-open Nos. 2006-001008, 2002-292501, H07-068401, H01-092001, and 2009-190119 propose a machine tool in which vibration is applied to a cutting tool by an actuator mechanism (piezo-electric element or the like) attached to a cutting tool holder or the like to cause the same to execute circular motion or elliptic motion.

However, such related arts suffer from the following problems.

In the machine tool described in Japanese Patent Application Laid-open No. 2013-103279, it is required to apply low-frequency vibration to a workpiece and a cutting tool. With a configuration that applies low-frequency vibration, however, ball screws used in a feeding mechanism causes a backlash. In order to reduce the impact of the backlash, it is required to increase the amplitude of the low-frequency vibration and the feeding speed of the feeding mechanism. In this regard, it may also be possible to use a linear motor that is free from the backlash. However, the linear motor results in an increase in the size, the weight, and the cost of the whole machine tool compared with the ball screws.

In addition, in the machine tool described in Japanese Patent Application Laid-open No. H06-285701, the numerical controller executes the forward movement, the suspension, and the reverse movement of the lathe-turning machining with the blade tip of the cutting tool coming in contact with the workpiece. Therefore, there is a likelihood that the cutting tool comes in contact with a processed machining surface to be damaged.

Moreover, in each of the machine tools described in Japanese Patent Application Laid-open Nos. 2006-001008, 2002-292501, H07-068401, H01-092001, and 2009-190119, it is required to attach the actuator mechanism to the cutting tool holder or the like, which results in an increase in the cost of the machine tool.

SUMMARY OF THE INVENTION

In view of the above problems in the related arts, the present invention has an object of providing a numerical controller capable of controlling a lathe machine tool to separate chips and circulate a coolant between the machining surface of a workpiece and the blade tip of a cutting tool without any specific mechanism or the like in lathe-turning machining.

An embodiment of the present invention provides a numerical controller that has a cutting in/out motion inserting function. The numerical controller is configured to control a machine tool according to a machining program, the machine tool performing lathe-turning machining in which a cutting tool moves in contact with a rotating workpiece to form the workpiece into a desired shape, the numerical controller including: a cutting in/out motion operation conditions analysis unit configured to analyze operation conditions for cutting in/out motion instructed in the machining program; and a cutting in/out motion inserting unit configured to generate an instruction of performing the cutting in/out motion based on the operation conditions analyzed by the cutting in/out motion operation conditions analysis unit and insert the generated instruction of performing the cutting in/out motion to an instruction of performing the lathe-turning machining.

Another embodiment of the present invention provides a numerical controller that has a circular motion inserting function. The numerical controller is configured to control a machine tool according to a machining program, the machine tool performing lathe-turning machining in which a cutting tool moves in contact with a rotating workpiece to form the workpiece into a desired shape, the numerical controller including: a circular motion operation conditions analysis unit configured to analyze operation conditions for circular motion instructed in the machining program; and a circular motion inserting unit configured to generate an instruction of performing the circular motion based on the operation conditions analyzed by the circular motion operation conditions analysis unit and insert the generated instruction of performing the circular motion to an instruction of performing the lathe-turning machining.

The cutting in/out motion inserting unit may be configured to insert the instruction of performing the cutting in/out motion at the same speed as a machining speed of the lathe-turning machining to the instruction of performing the lathe-turning machining.

The circular motion inserting unit may be configured to insert the instruction of performing the circular motion at the same tangential speed as a machining speed of the lathe-turning machining to the instruction of performing the lathe-turning machining.

The cutting in/out motion inserting unit may be configured to suspend the inserting of the instruction of performing the cutting in/out motion, change a cutting in/out amount in the instruction of performing the cutting in/out motion, or change a position, at which the instruction of performing the cutting in/out motion is inserted, to prevent the cutting in/out motion from interfering with the machining path when the inserted cutting in/out motion interferes with a machining path of the lathe-turning machining.

The circular motion inserting unit may be configured to suspend the inserting of the instruction of performing the circular motion, change a radius in the instruction of performing the circular motion, or change a position, at which the instruction of performing the circular motion is inserted, to prevent the circular motion from interfering with the machining path when the inserted circular motion interferes with a machining path of the lathe-turning machining.

According to an embodiment of the present invention, it becomes possible to insert cutting in/out motion or circular motion to lathe-turning machining at any timing and in any movement amount. Since the cutting in/out motion or the circular motion is inserted to the control of a cutting tool, chips resulting from the lathe-turning machining of the machine tool are separated and a coolant is circulated between the machining surface of a workpiece and the blade tip of the cutting tool. Thus, it becomes possible to expect the longer service-life of the cutting tool of the machine tool as a control target and respond to the machining of a hard-to-cut material. In addition, since it becomes possible to reduce the deformation of the blade tip of the cutting tool due to heat generated at machining, an improvement in the machining accuracy may be expected.

BRIEF DESCRIPTION OF THE DRAWINGS

The above and other objects and features of the present invention will become apparent from the descriptions of the following embodiments with reference to the accompanying drawings in which;

FIG. 6 is a diagram showing an example of a machining program according to the first embodiment of the present invention;

FIG. 12 is a diagram showing an example of a machining program according to the second embodiment of the present invention;

DETAILED DESCRIPTION OF THE PREFERRED EMBODIMENTS

Figure 1:
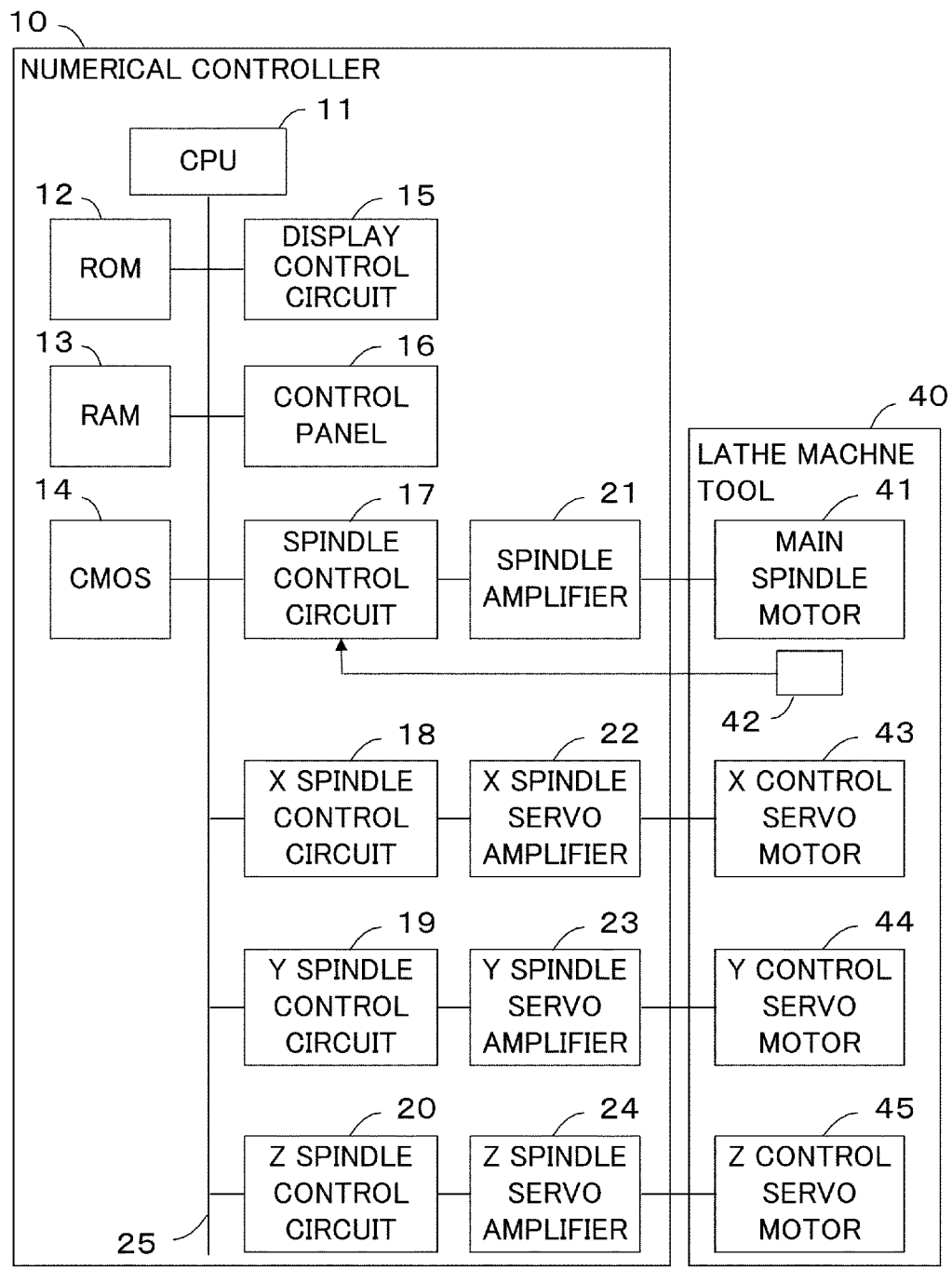
FIG. 1 is a hardware configuration diagram of a numerical controller according to an embodiment of the present invention.

FIG. 1 is a schematic block diagram of a numerical controller 10. The numerical controller 10 has a processor (CPU) 11, a ROM 12, a RAM 13, a CMOS memory 14, a display control circuit 15, a control panel 16, a main spindle control circuit 17, axis control circuits 18 to 20, a spindle amplifier 21, axis servo amplifiers 22 to 24, and a bus 25. The CPU 11 reads a system program stored in the ROM 12 via the bus 25 and controls the whole numerical controller 10 according to the system program. The RAM 13 temporarily stores temporary calculation and display data and various data input via an input unit (not shown). The ROM 12 stores in advance edit functions and various system programs required to generate and edit a machining program. The CMOS memory 14 is constituted as a non-volatile memory that is supported by a battery (not shown) and maintains its storage state even if the power of the numerical controller 10 is turned off. The CMOS memory 14 stores a machining program or the like.

The main spindle control circuit 17 outputs a spindle speed signal to the spindle amplifier 21 when receiving an instruction to rotate a main spindle. Upon receiving the spindle speed signal, the spindle amplifier 21 rotates a main spindle motor 41 at an instructed rotation speed. A position coder 42 feeds back a feedback pulse to the main spindle control circuit 17 in synchronization with the rotation of the main spindle motor 41 to control the speed of the main spindle motor 41.

The axis control circuits 18 to 20 receive a movement instruction to the axis that performs a cutting operation and output the same to the axis servo amplifiers 22 to 24. Upon receiving the instruction, the axis servo amplifiers 22 to 24 drive the control servo motors 43 to 45 of a lathe machine tool 40. Each of the control servo motors 43 to 45 includes a position/speed detector (not shown) and feeds back a position/speed feedback signal from the position/speed detector to the axis control circuits 18 to 20 to perform position/speed feedback control. Note that the description of the position/speed feedback control will be omitted.

The following first to sixth embodiments have the above configuration shown in FIG. 1

First Embodiment

The first embodiment will describe an example of inserting cutting in/out motion, in which a polygonal shape having three or more apexes is formed by the track of a cutting tool, to the machining operation of lathe-turning machining.

Figure 2A:
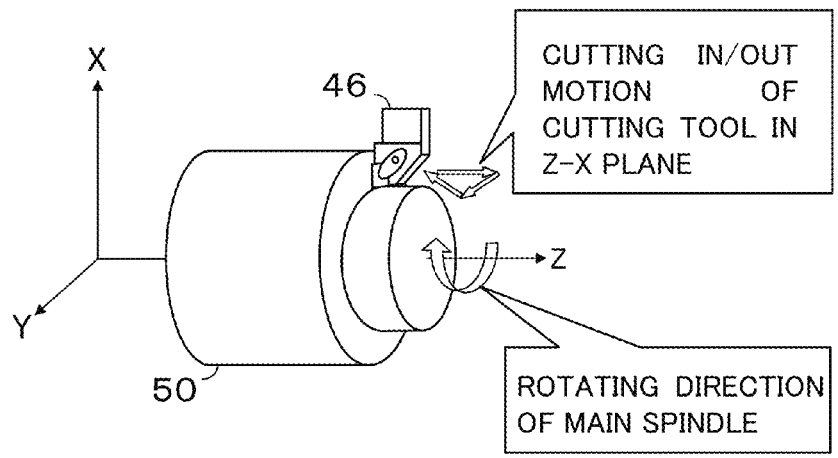
FIGS. 2A, 2B, and 2C are diagrams showing an operation according to a first embodiment of the present invention.
Figure 2B:
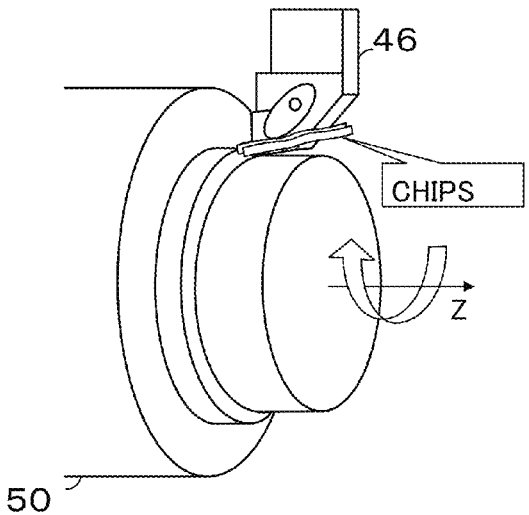
Figure 2C:
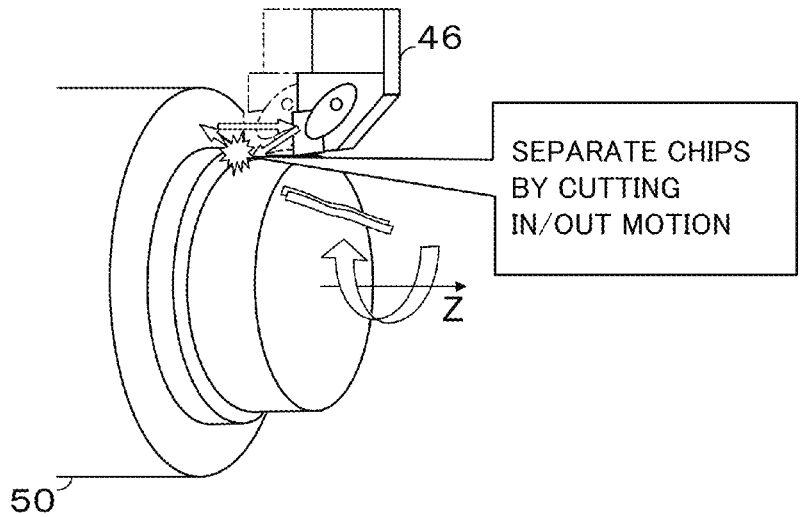

FIGS. 2A to 2C are image diagrams showing the cutting in/out motion according to the first embodiment. When a cutting tool 46 is brought into contact with a rotating workpiece 50 to perform lathe-turning machining, the workpiece is cut to generate chips. With the inserting of the cutting in/out motion of the cutting tool 46 in a Z-X plane during the operation of the above cutting machining, it becomes possible to separate the chips and circulate a coolant between the cutting tool 46 and the workpiece 50.

Figure 3:
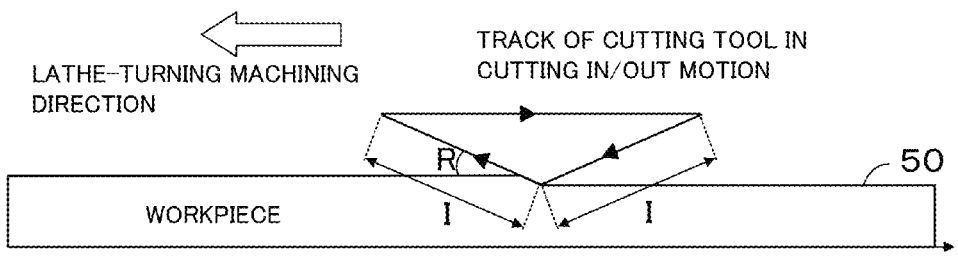
FIG. 3 is a diagram showing the operation of cutting in/out motion according to the first embodiment of the present invention.

FIG. 3 is an enlarged diagram of the cutting in/out motion in the Z-X plane when seen from a Y axis. The cutting in/out motion is motion in which the track of the cutting tool is represented by a triangle of which the two sides correspond to the cutting in/out motion, and is defined by arbitrarily setting a cutting in/out angle R and a cutting in/out amount I with respect to the machining surface of the workpiece 50.

Figure 4:
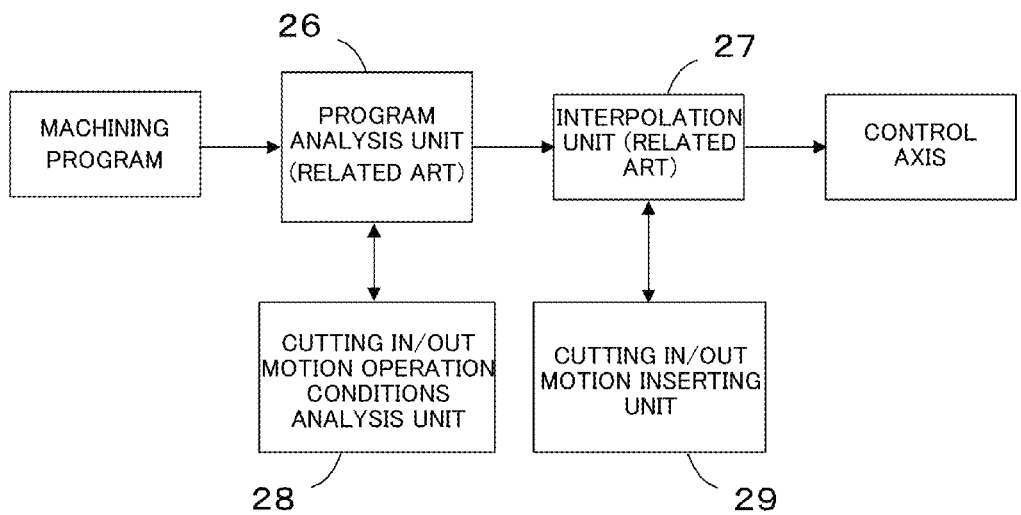
FIG. 4 is a functional block diagram according to the first embodiment of the present invention.

FIG. 4 is a block diagram showing the functional configuration of the numerical controller 10 according to the first embodiment.

The CPU 11 of the numerical controller 10 reads and executes the system program stored in the ROM 12 to serve as a program analysis unit 26, an interpolation unit 27, a cutting in/out motion operation conditions analysis unit 28, and a cutting in/out motion inserting unit 29. The program analysis unit 26 analyzes the machining program read from the CMOS memory 14 to output analysis data. When the program analysis unit 26 finds a cutting in/out motion operation conditions instruction block in the machining program, the cutting in/out motion operation conditions analysis unit 28 operates and analyzes the cutting in/out motion operation conditions instruction block to generate the analysis data of the cutting in/out motion. Then, the cutting in/out motion operation conditions analysis unit 28 outputs the generated analysis data to the program analysis unit 26. The interpolation unit 27 generates and outputs a lathe-turning machining movement instruction for the control axis based on the analysis data acquired from the program analysis unit 26. In addition, the cutting in/out motion inserting unit 29 operates at a timing at which the cutting in/out motion is operated. The cutting in/out motion inserting unit 29 generates a cutting in/out motion instruction and outputs the same to the interpolation unit 27. Then, when the axis is controlled based on the cutting in/out motion instruction, the inserting of the cutting in/out motion is achieved.

Figure 5:
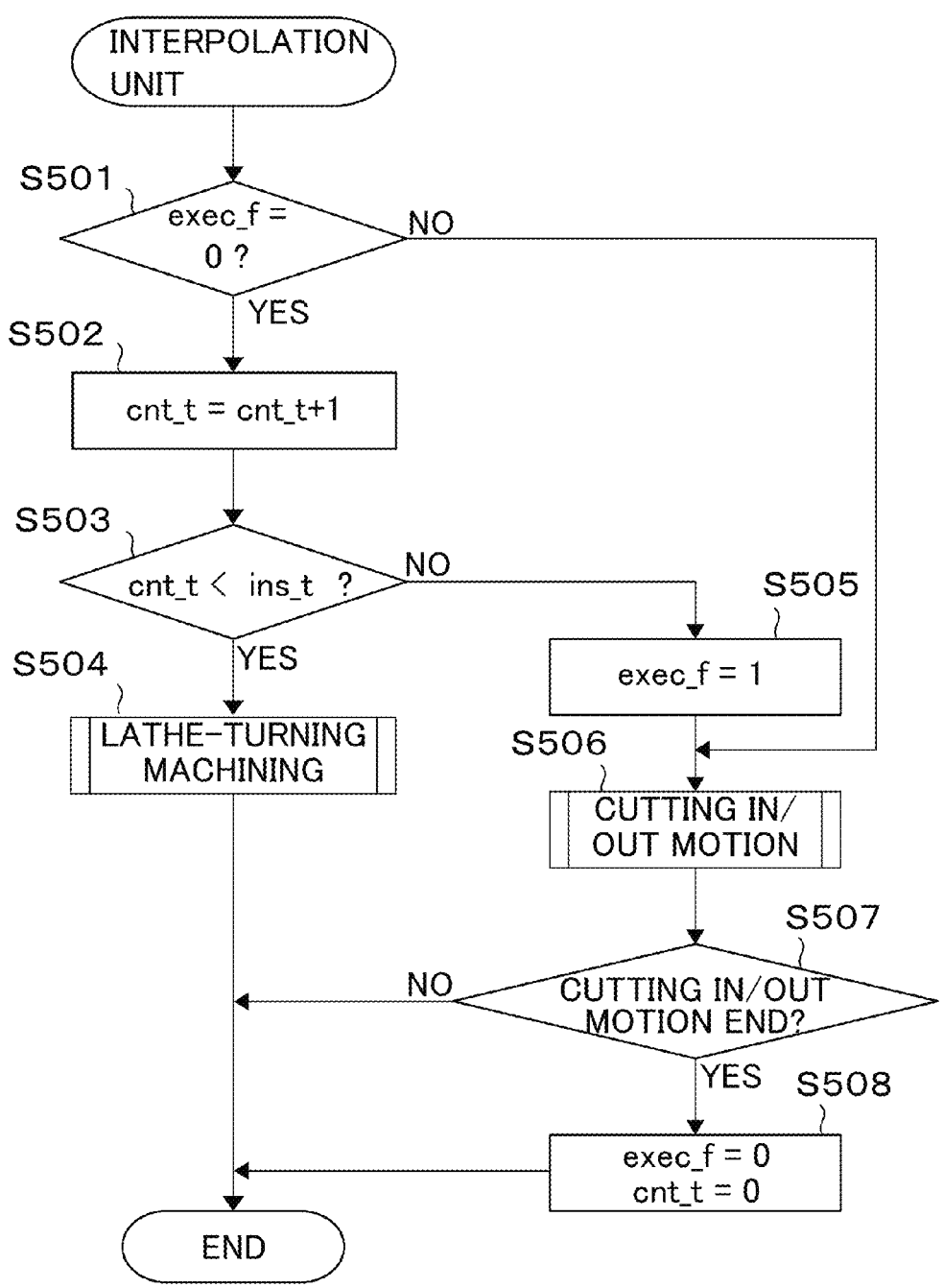
FIG. 5 is a flowchart for describing the cutting in/out motion inserting processing of an interpolation unit according to the first embodiment of the present invention.

FIG. 5 is a flowchart for describing the cutting in/out motion inserting processing of the interpolation unit 27.

In the flowchart of FIG. 5, a cutting in/out motion execution flag exec_f represents whether the cutting in/out motion is being executed. In addition, a time counter cnt_t represents a time since the execution of the previous cutting in/out motion, and a cutting in/out motion inserting interval ins_t represents the inserting interval of the cutting in/out motion.

The interpolation unit 27 refers to the cutting in/out motion execution flag exec_f to determine whether the cutting in/out motion is being executed (S501). When it is determined that the cutting in/out motion is not being executed, the interpolation unit 27 increments the count of the time counter cnt_t (S502).

Then, the interpolation unit 27 determines whether the value of the time counter cnt_t is smaller than that of the cutting in/out motion inserting interval ins_t (S503). When it is determined that the value of the time counter cnt_t is smaller than that of the cutting in/out motion inserting interval ins_t, the interpolation unit 27 continuously controls the axis based on a lathe-turning machining movement instruction (S504).

When it is determined in S503 that the value of the time counter cnt_t is greater than that of the cutting in/out motion inserting interval ins_t, the interpolation unit 27 turns on the cutting in/out motion execution flag exec_f (S505) to execute the cutting in/out motion inserting processing based on a cutting in/out motion operation conditions instruction (S506). Then, the interpolation unit 27 determines whether the cutting in/out motion has ended (S507). When it is determined that the cutting in/out motion has not ended, the interpolation unit 27 ends its processing while maintaining the cutting in/out motion execution flag exec_f. On the other hand, when it is determined that the cutting in/out motion has ended, the interpolation unit 27 resets the values of the cutting in/out motion execution flag exec_f and the time counter cnt_t (S508) to end its processing.

Note that when it is determined in S501 that the cutting in/out motion is being executed, the interpolation unit 27 continuously executes the cutting in/out motion.

When the above processing of the interpolation unit 27 is repeatedly executed on the numerical controller 10, the cutting in/out motion inserting processing for a cutting machining operation based on a cutting machining movement instruction is executed.

Next, taking the machining program of FIG. 6 as an example, an operation example of inserting the cutting in/out motion to lathe-turning machining with the numerical controller 10 according to the first embodiment will be described.

In FIG. 6, an N03 block represents a cutting in/out motion operation conditions instruction block in which operation conditions for the cutting in/out motion are set. The operation conditions for the cutting in/out motion set in the cutting in/out motion operation conditions instruction block have the following meanings.

I10.0="cutting in/out amount" (10.0 mm)

R5.0="cutting in/out angle with respect to machining surface" (5.0 deg)

P3="form of cutting in/out motion" (triangle of which the two sides correspond to cutting in/out motion)

F2.0="cutting in/out speed" (2.0 mm/rev)

T5000="inserting interval of cutting in/out motion" (5000 ms)

SB5="block number at which inserting of cutting in/out motion starts" (N05 block)

EB6="block number at which inserting of cutting in/out motion ends" (N06 block)

Based on the details of the respective blocks of the machining program of FIG. 6, the numerical controller according to the first embodiment controls the lathe-turning machine tool as follows.

(N01 block) The numerical controller sets the lathe-turning machine tool at the position of X45.0, Z200.0, and Y0.0.

(N02 block) The numerical controller rotates the main spindle clockwise at 500 rev/min.

(N03 block) The operation conditions for the cutting in/out motion are instructed to start a cutting in/out motion inserting function.

(N04 block) The numerical controller feeds the lathe-turning machine tool to the position of X50.0 at 1.5 mm/rev for cutting.

(N05 block) The numerical controller feeds the lathe-turning machine tool to the position of Z150.0 at 1.5 mm/rev for cutting. In addition, the numerical controller stops the movement of the axis based on the machining program at an interval of 5000 ms after the start of the N05 block with the cutting in/out motion inserting function, which has started at the N03 block, to insert the cutting in/out motion.

(N06 block) The numerical controller feeds the lathe-turning machine tool to the position of Z100.0 at 0.5 mm/rev for cutting. In addition, the numerical controller also inserts the cutting in/out motion during the execution of the N06 block in succession to the N05 block. When the N06 block comes to an end, the numerical controller stops inserting the cutting in/out motion.

(N07 block) The numerical controller feeds the lathe-turning machine tool to the position of X45.0 and Z80.0 at 1.5 mm/rev for cutting.

(N08 block) The numerical controller feeds the lathe-turning machine tool to the position of Z50.0 at 1.5 mm/rev for cutting.

(N09 block) The numerical controller feeds the lathe-turning machine tool to the position of X60.0 at 1.5 mm/rev for cutting.

Figure 7:
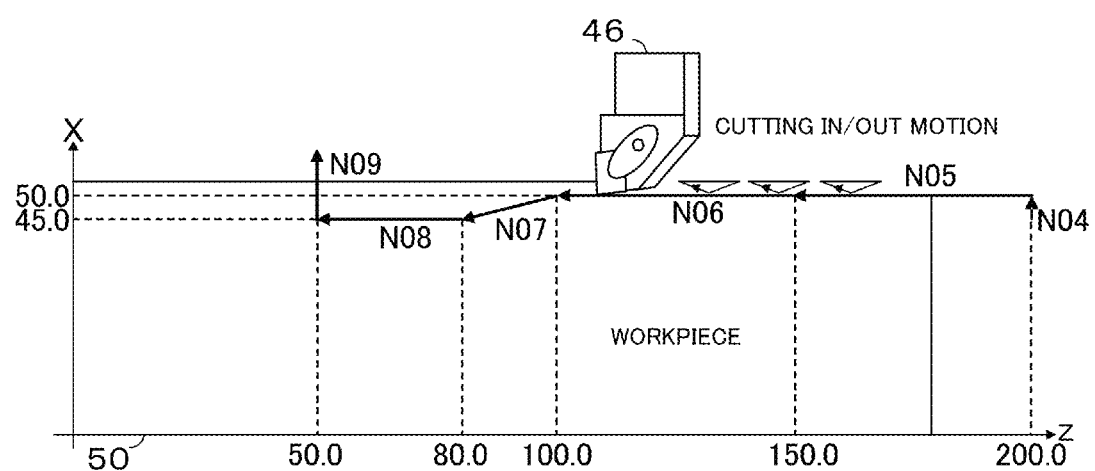
FIG. 7 is a diagram showing an operation example of the machining program according to the first embodiment of the present invention.

FIG. 7 is a diagram showing the operation of the lathe-turning machine tool controlled based on the machining program. In FIG. 7, the respective arrows N04 to N09 represent the tracks of the cutting tool 46 according to the control of their corresponding blocks of the machining program of FIG. 6. In addition, inverted-triangle tracks shown at the positions of N05 and N06 represent the tracks of the cutting tool 46 in the cutting in/out motion instructed in the N03 block.

As described above, since the cutting in/out motion is inserted to the cutting of the workpiece 50 to allow the workpiece 50 and the cutting tool 46 to separate from each other in the first embodiment, it becomes possible to improve the separation of chips and efficiently cool the cutting tool. Accordingly, problems such as damage on the workpiece 50 due to chips and reduction in the service life of the cutting tool and machining accuracy due to the insufficient cooling of the cutting tool 46, which have been found in conventional lathe-turning machining, are addressed.

Second Embodiment

The above first embodiment describes an example of inserting the cutting in/out motion, in which a polygonal shape having three or more apexes is formed by the track of the cutting tool, to the machining operation of the lathe-turning machining. While, a second embodiment will describe an example of inserting circular motion to the machining operation of lathe-turning machining.

Figure 8A:
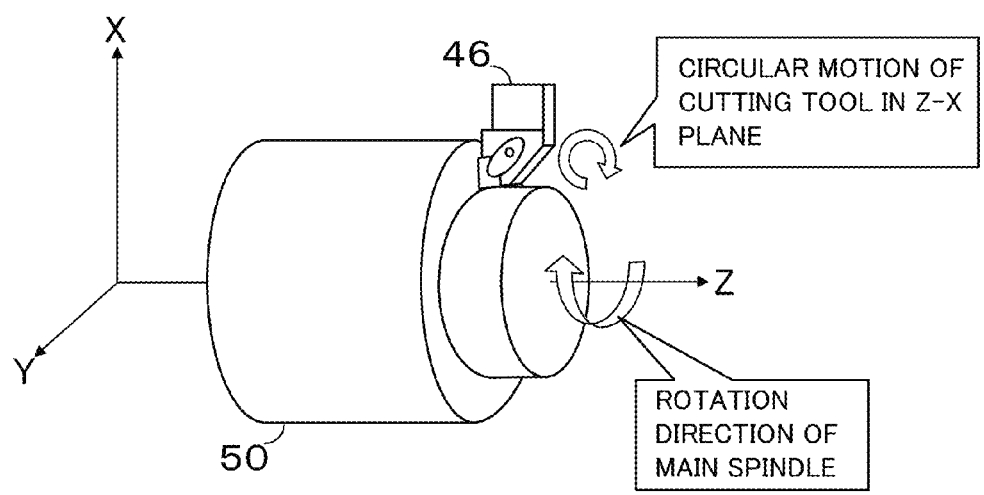
FIGS. 8A, 8B, and 8C are diagrams showing an operation according to a second embodiment of the present invention.
Figure 8B:
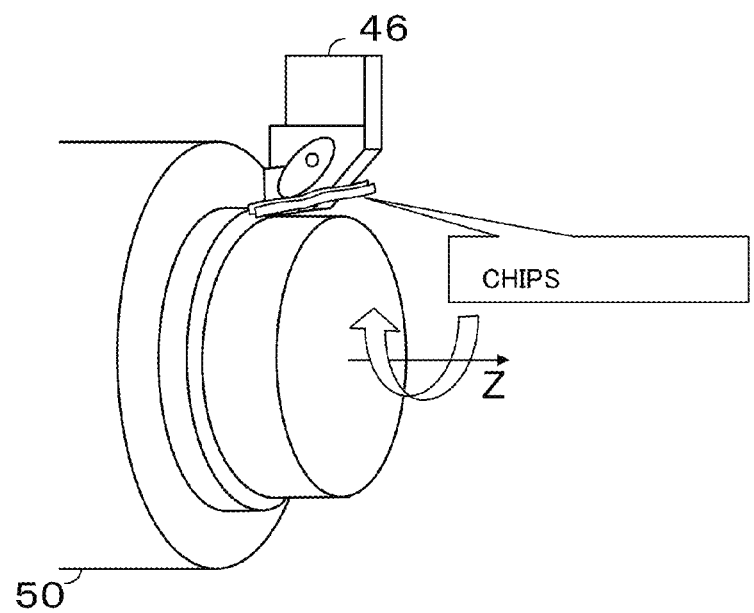
Figure 8C:
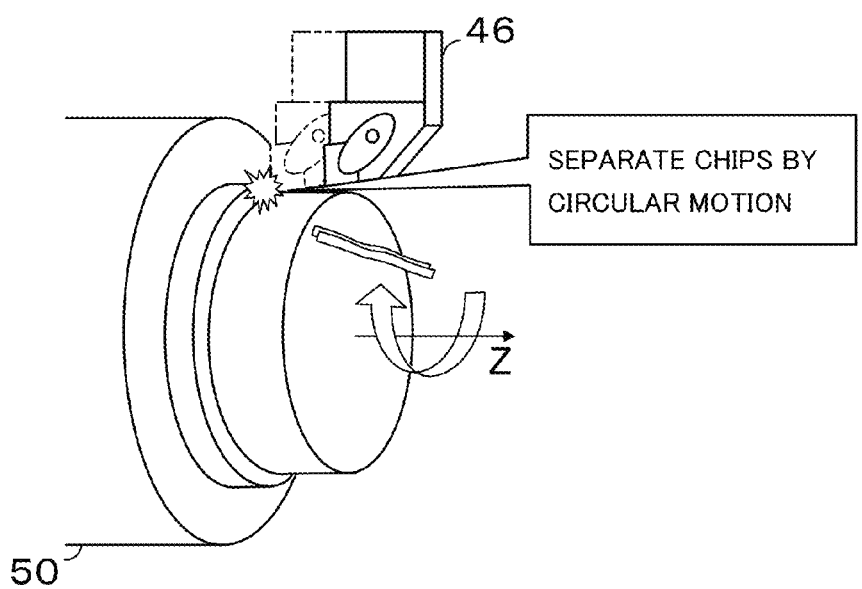

FIGS. 8A to 8C are image diagrams showing the circular motion according to the second embodiment. When a cutting tool 46 is brought into contact with a rotating workpiece 50 to perform lathe-turning machining, the workpiece 50 is cut to generate chips. With the inserting of the circular motion of the cutting tool 46 in a Z-X plane during the operation of the above cutting machining, it becomes possible to separate the chips and circulate a coolant between the cutting tool 46 and the workpiece 50.

Figure 9:
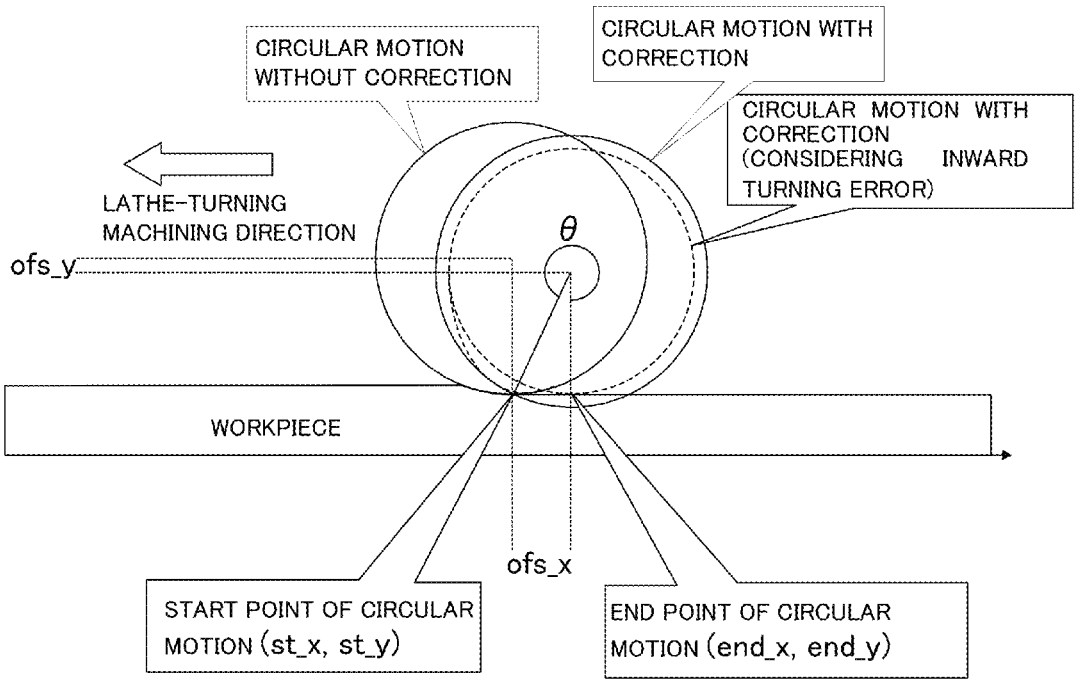
FIG. 9 is a diagram showing the operation of circular motion according to the second embodiment of the present invention.

FIG. 9 is an enlarged diagram of the circular motion in the Z-X plane when seen from a Y axis. The circular motion is motion in which the track of the cutting tool 46 is represented by a circle, and is defined by arbitrarily setting the radius of the circular motion.

Figure 10:
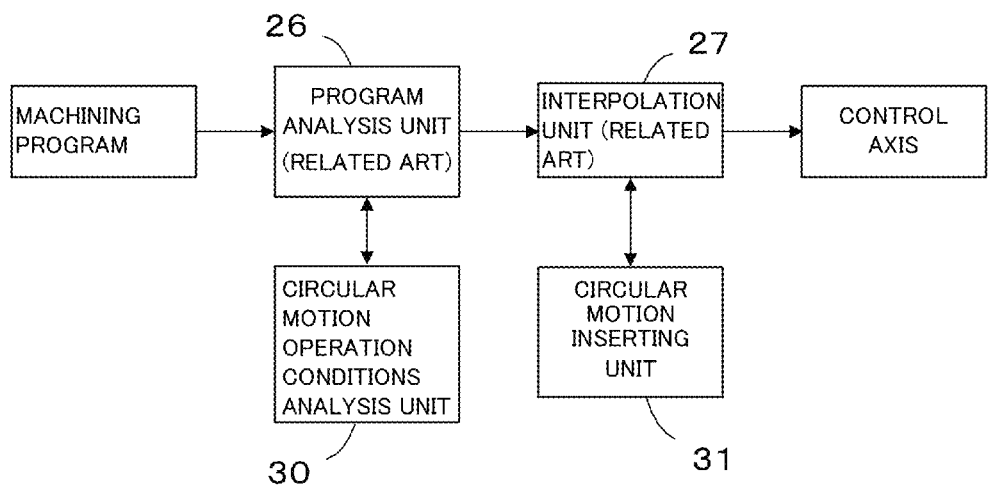
FIG. 10 is a functional block diagram according to the second embodiment of the present invention.

FIG. 10 is a block diagram showing the functional configuration of a numerical controller 10 according to the second embodiment.

A CPU 11 of the numerical controller 10 reads and executes a system program stored in a ROM 12 to serve as a program analysis unit 26, an interpolation unit 27, a circular motion operation conditions analysis unit 30, and a circular motion inserting unit 31. The program analysis unit 26 analyzes a machining program read from a CMOS memory 14 to output analysis data. When the program analysis unit 26 finds a circular motion operation conditions instruction block in the machining program, the circular motion operation conditions analysis unit 30 operates and analyzes the circular motion operation conditions instruction block to generate the analysis data of the circular motion. Then, the circular motion operation conditions analysis unit 30 outputs the generated analysis data to the program analysis unit 26. The interpolation unit 27 generates and outputs a lathe-turning machining movement instruction for the control axis based on the analysis data acquired from the program analysis unit 26. In addition, the circular motion inserting unit 31 operates at a timing at which the circular motion is operated. The circular motion inserting unit 31 generates a circular motion instruction and outputs the same to the interpolation unit 27. Then, when the axis is controlled based on the circular motion instruction, the inserting of the circular motion is achieved.

Figure 11:
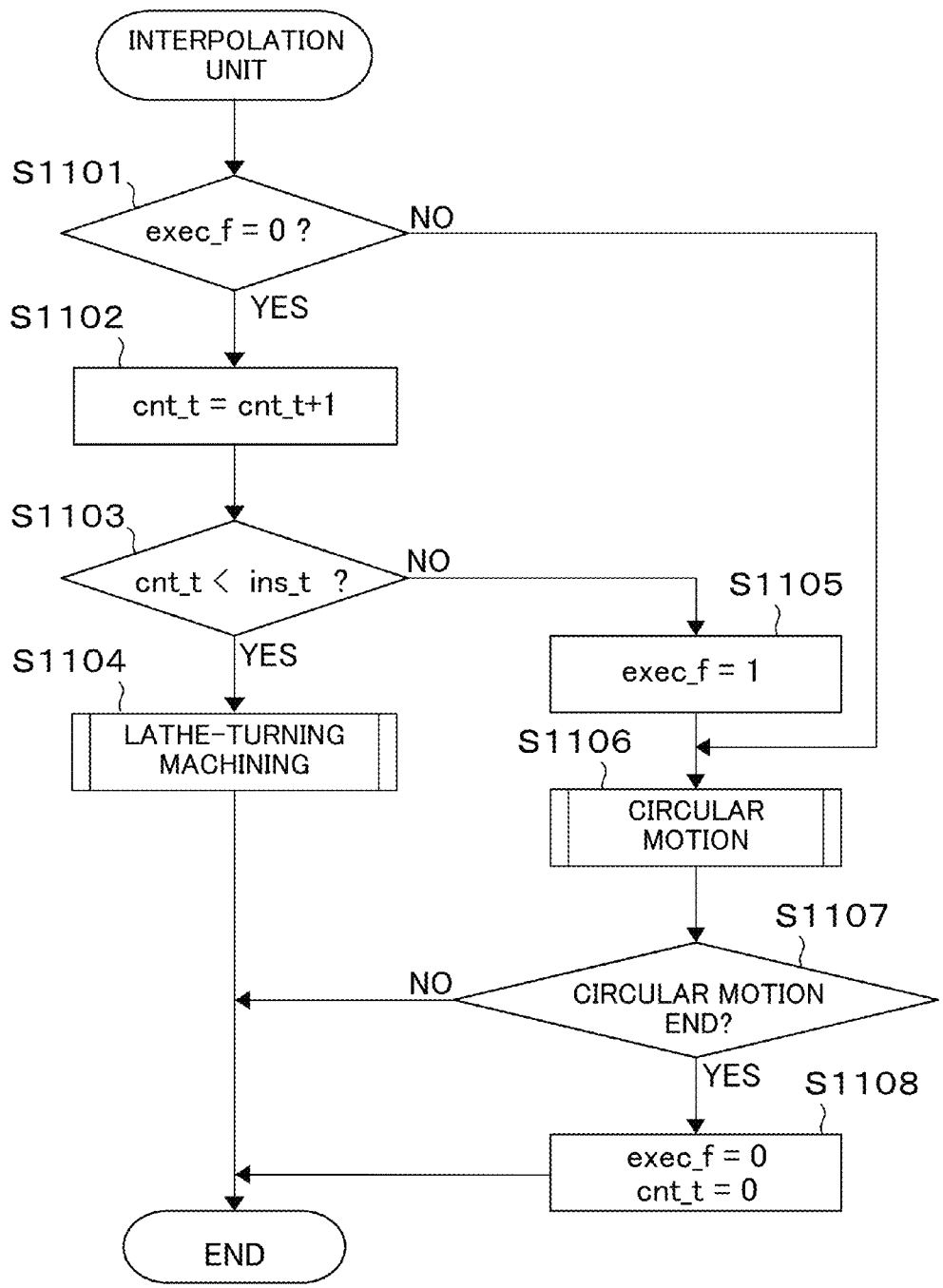
FIG. 11 is a flowchart for describing the circular motion inserting processing of an interpolation unit according to the second embodiment of the present invention.

FIG. 11 is a flowchart for describing the circular motion inserting processing of the interpolation unit 27.

In the flowchart of FIG. 11, a circular motion execution flag exec_f represents whether the circular motion is being executed. In addition, a time counter cnt_t represents a time since the execution of the previous circular motion, and a circular motion inserting interval ins_t represents the inserting interval of the circular motion.

The interpolation unit 27 refers to the circular motion execution flag exec_f to determine whether the circular motion is being executed (S1101). When it is determined that the circular motion is not being executed, the interpolation unit 27 increments the count of the time counter cnt_t (S1102). Then, the interpolation unit 27 determines whether the value of the time counter cnt_t is smaller than that of the circular motion inserting interval ins_t (S1103). When it is determined that the value of the time counter cnt_t is smaller than that of the circular motion inserting interval ins_t, the interpolation unit 27 continuously controls the axis based on a lathe-turning machining movement instruction (S1104).

When it is determined in S1103 that the value of the time counter cnt_t is greater than that of the circular motion inserting interval ins_t, the interpolation unit 27 turns on the circular motion execution flag exec_f (S1105) to execute the circular motion inserting processing based on a circular motion operation conditions instruction (S1106). Then, the interpolation unit 27 determines whether the circular motion has ended (S1107). When it is determined that the circular motion has not ended, the interpolation unit 27 ends its processing while maintaining the circular motion execution flag exec_f. On the other hand, when it is determined that the circular motion has ended, the interpolation unit 27 resets the values of the circular motion execution flag exec_f and the time counter cnt_t (S1108) to end its processing.

Note that when it is determined in S1101 that the circular motion is being executed, the interpolation unit 27 continuously executes the circular motion.

By the repeated execution of the above processing of the interpolation unit 27 on the numerical controller 10, the circular motion inserting processing for a cutting machining operation based on a cutting machining movement instruction is executed.

Next, taking the machining program of FIG. 12 as an example, an operation example of inserting the circular motion to lathe-turning machining with the numerical controller 10 according to the second embodiment will be described.

In FIG. 12, an N03 block represents a circular motion operation conditions instruction block in which operation conditions for the circular motion are set. The operation conditions for the circular motion set in the circular motion operation conditions instruction block have the following meanings.

R5.0="radius of circular motion" (5.0 mm)
G18="plane of circular motion" (Z-X plane)
Q0="direction of circular motion" (clockwise direction in right-handed orthogonal coordinate system)
F2.0="tangential speed of circular motion" (2.0 mm/rev)
T5000="inserting interval of circular motion" (5000 ms)
SB5="block number at which inserting of circular motion starts" (N05 block)
EB6="block number at which inserting of circular motion ends" (N06 block)

Based on the details of the respective blocks of the machining program of FIG. 12, the numerical controller controls the lathe-turning machine tool as follows.

(N01 block) The numerical controller sets the lathe-turning machine tool at the position of X45.0, Z200.0, and Y0.0.

(N02 block) The numerical controller rotates the main spindle clockwise at 500 rev/min.

(N03 block) The operation conditions for the circular motion are instructed to start the circular motion inserting function.

(N04 block) The numerical controller feeds the lathe-turning machine tool to the position of X50.0 at 1.5 mm/rev for cutting.

(N05 block) The numerical controller feeds the lathe-turning machine tool to the position of Z150.0 at 1.5 mm/rev for cutting. In addition, then numerical controller stops the movement of the axis based on the machining program at an interval of 5000 ms after the start of the N05 block with the circular motion inserting function, which has started at the N03 block, to insert the circular motion.

(N06 block) The numerical controller feeds the lathe-turning machine tool to the position of Z100.0 at 0.5 mm/rev for cutting. In addition, the numerical controller also inserts the circular motion during the execution of the N06 block in succession to the N05 block. When the N06 block comes to an end, the numerical controller stops inserting the circular motion.

(N07 block) The numerical controller feeds the lathe-turning machine tool to the position of X45.0 and Z80.0 at 1.5 mm/rev for cutting.

(N08 block) The numerical controller feeds the lathe-turning machine tool to the position of Z50.0 at 1.5 mm/rev for cutting.

(N09 block) The numerical controller feeds the lathe-turning machine tool to the position of X60.0 at 1.5 mm/rev for cutting.

Figure 13:
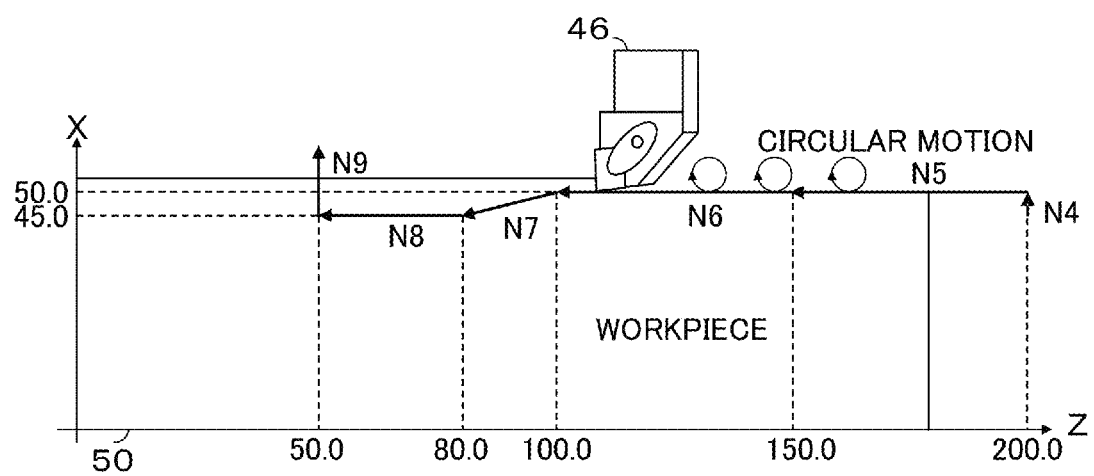
FIG. 13 is a diagram showing an operation example of the machining program according to the second embodiment of the present invention.

FIG. 13 is a diagram showing the operation of the lathe-turning machine tool controlled based on the machining program.

In FIG. 13, the respective arrows N04 to N09 represent the tracks of the cutting tool 46 according to the control of their corresponding blocks of the machining program of FIG. 13. In addition, circular tracks shown at the positions of N05 and N06 represent the tracks of the cutting tool 46 in the circular motion instructed in the N03 block.

It is also possible to calculate the radius and the tangential speed of the optimum circular motion at inserting the circular motion and apply the same to the circular motion. Here, it is required that the following conditions be satisfied to obtain the radius and the tangential speed of the optimum circular motion.

(1) The radius of the circular motion is greater than a cutting-in amount in the lathe-turning machining.

(2) The feeding speed of the lathe-turning machining is not significantly deviated from the tangential speed of the circular motion.

(3) The circular motion ends in a very short period of time.

(4) The circular motion per interpolation cycle has a movement angle of 1° or more.

When the numerical controller 10 is so configured as to automatically calculate the radius and the tangential speed of the circular motion that satisfies the above conditions, the labor of the creator of the machining program may be lessened.

In addition, due to a delay in a control system or the like, the circular motion of the cutting tool 46 causes an inward turning error in the actual motion of the cutting tool 46. As a result, the form of the circular motion becomes smaller than the form instructed in the circular motion operation conditions instruction block, and the position of the cutting tool 46 after the inserting of the circular motion may not reach the machining surface in the lathe-turning machining. In order to prevent such a problem, it is also possible to offset the central coordinates of the circular motion to make the path of the circular motion overlap with the machining surface.

An offset amount ofs_y of the central coordinates in a direction perpendicular to the machining surface and an offset amount ofs_x of the central coordinates in a direction horizontal to the machining surface may be calculated based on the following formula.

$$\text{ofs\_y} = re \quad (1)$$

$$\text{ofs\_x} = r \times \sqrt{1 - \left(\frac{r - re}{r}\right)^2}$$

Here, r represents the radius of the circular motion, re represents the inward turning error of the circular motion, and ofs_x represents the distance between the end point and the start point of the circular motion.

The inward turning error of the circular motion used in the above formula (1) may be measured in advance based on, for example, a double ball bar (DBB) method or the like.

Alternatively, the inward turning error in one pattern is measured in advance, and the "inward turning error of the circular motion," the "tangential speed of the circular motion," and the "radius of the circular motion" at the measurement are assigned to the following formula. In this way, it is also possible to calculate the inward turning error of the theoretical circular motion.

$$re_2 = \frac{r_1 \times re_1}{v_1^2} \times \frac{v_2^2}{r_2} \quad (2)$$

Here, $re_1$ represents the "inward turning error of the circular motion" measured in advance, $re_2$ represents the inward turning error of the circular motion, $r_1$ represents the "radius of the circular motion" measured in advance, $r_2$ represents the radius of the circular motion, $v_1$ represents the "tangential speed of the circular motion" measured in advance, and $v_2$ represents the tangential speed of the circular motion.

Meanwhile, even if the central coordinates of the circular motion are only offset, the path of the circular motion overlaps with the machining surface in the lathe-turning machining but the end point of the circular motion deviates from the machining surface. Therefore, the circular motion ends at a position at which the path of the circular motion crosses the machining surface and linearly moves to the start position thereof. In this way, it is possible to coincide the position at which the inserting of the circular motion starts with the position at which the lathe-turning machining starts after the inserting of the circular motion. Based on the following formula, the end point and the distance between the end point and the start point of the corrected circular motion are calculated.

$$end\_y = st\_y$$

$$end\_x = st\_x - ofs\_x$$

$$dist = ofs\_x \quad (3)$$

Here, end_y represents the end point of the corrected circular motion (in the direction perpendicular to the machining surface), end_x represents the end point of the corrected circular motion (in the direction horizontal to the machining surface), st_y represents the start point of the circular motion (in the direction perpendicular to the machining surface), st_x represents the start point of the circular motion (in the direction horizontal to the machining surface), and dist represents the distance between the end point and the start point of the circular motion.

As described above, since the circular motion is inserted to the cutting of the workpiece to allow the workpiece 50 and the cutting tool 46 to separate from each other in the second embodiment, it becomes possible to improve the separation of chips and efficiently cool the cutting tool 46. Accordingly, problems such as damage on the workpiece 50 due to chips and reduction in the service life of the cutting tool and machining accuracy due to the insufficient cooling of the cutting tool 46, which have been found in conventional lathe-turning machining, are addressed.

Third Embodiment

A third embodiment will describe an example of a case in which the speed of the cutting in/out motion is significantly deviated from the feeding speed of the lathe-turning machining when the cutting in/out motion is inserted to the machining operation of the lathe-turning machining.

In the above first embodiment, the cutting in/out motion is inserted to the machining operation of the lathe-turning machining. However, when the feeding speed of the lathe-turning machining is significantly deviated from the speed of the cutting in/out motion, there is a likelihood that the cutting tool 46 and the workpiece 50 receive a shock or the machining accuracy of the workpiece 50 reduces. Therefore, in the third embodiment, the speed of the cutting in/out motion is corrected such that the cutting in/out motion is performed at the same speed as the machining speed of the lathe-turning machining. Note that FIG. 14 is an image diagram according to the third embodiment.

Next, taking the machining program of FIG. 15 as an example, an operation example of inserting the cutting in/out motion to the lathe-turning machining with the numerical controller 10 according to the third embodiment will be described.

Figures 14, 15:
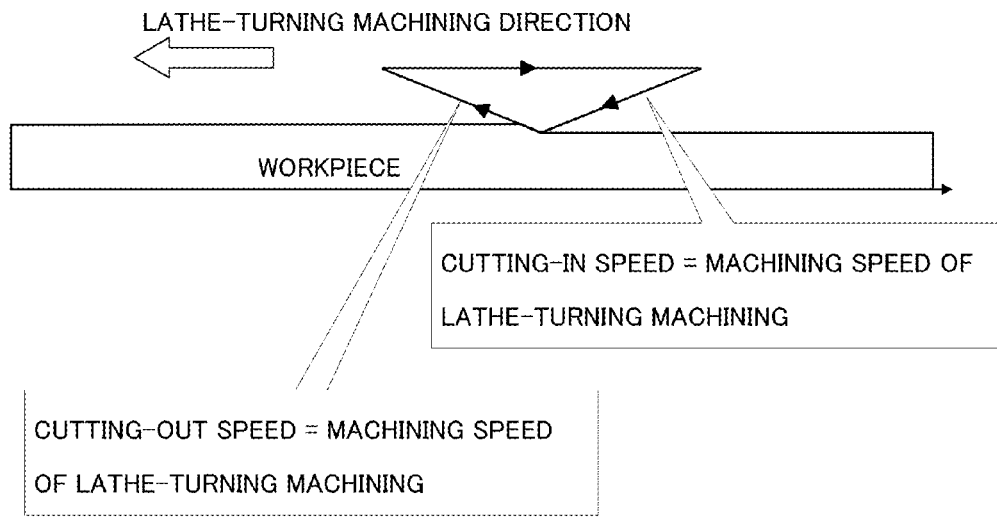
FIG. 14 is a diagram showing the operation of the cutting in/out motion according to a third embodiment of the present invention.
FIG. 15 is a diagram showing an example of a machining program according to the third embodiment of the present invention.

The machining program of FIG. 15 has the same instruction blocks as those of the machining program of FIG. 6 described in the first embodiment. Here, it is to be noted that the cutting in/out speed set in the instruction of the N03 block differs from the machining speeds instructed in the N05 and N06 blocks at which the lathe-turning machining operation for inserting the cutting in/out motion is instructed.

Based on the details of the respective blocks of the machining program of FIG. 15, the numerical controller according to the third embodiment controls the lathe-turning machine tool as follows.

(N01 block) The numerical controller sets the lathe-turning machine tool at the position of X45.0, Z200.0, and Y0.0.

(N02 block) The numerical controller rotates the main spindle clockwise at 500 rev/min.

(N03 block) The operation conditions for the cutting in/out motion are instructed to start the cutting in/out motion inserting function.

(N04 block) The numerical controller feeds the lathe-turning machine tool to the position of X50.0 at 1.5 mm/rev for cutting.

(N05 block) The numerical controller feeds the lathe-turning machine tool to the position of Z150.0 at 1.5 mm/rev for cutting. In addition, the numerical controller stops the movement of the axis based on the machining program at an interval of 5000 ms after the start of the N05 block with the cutting in/out motion inserting function, which has started at the N03 block, to insert the cutting in/out motion. Note that the speed of the cutting in/out motion is corrected into 1.5 mm/rev based on the machining speed of the lathe-turning machining instructed in this block.

(N06 block) The numerical controller feeds the lathe-turning machine tool to the position of Z100.0 at 0.5 mm/rev for cutting. In addition, the numerical controller also inserts the cutting in/out motion during the execution of the N06 block in succession to the N05 block. Note that the speed of the cutting in/out motion is corrected into 0.5 mm/rev based on the machining speed of the lathe-turning machining instructed in this block. When the N06 block comes to an end, the numerical controller stops inserting the cutting in/out motion.

(N07 block) The numerical controller feeds the lathe-turning machine tool to the position of X45.0 and Z80.0 at 1.5 mm/rev for cutting.

(N08 block) The numerical controller feeds the lathe-turning machine tool to the position of Z50.0 at 1.5 mm/rev for cutting.

(N09 block) The numerical controller feeds the lathe-turning machine tool to the position of X60.0 at 1.5 mm/rev for cutting.

As described above, since the speed of the cutting in/out motion is corrected to coincide with the machining speed of the lathe-turning machining when the cutting in/out motion is inserted to the machining operation of the lathe-turning machining in the third embodiment, there is no likelihood that the cutting tool 46 and the workpiece 50 receive a shock or the machining accuracy of the workpiece 50 reduces.

Fourth Embodiment

A fourth embodiment will describe an example of a case in which the tangential speed of the circular motion is significantly deviated from the feeding speed of the lathe-turning machining when the circular motion is inserted to the machining operation of the lathe-turning machining.

In the above second embodiment, the circular motion is inserted to the machining operation of the lathe-turning machining. However, when the feeding speed of the lathe-turning machining is significantly deviated from the speed of the circular motion, there is a likelihood that the cutting tool and the workpiece receive a shock or the machining accuracy of the workpiece reduces. Therefore, in the fourth embodiment, the tangential speed of the circular motion is corrected such that the circular motion is performed at the same speed as the machining speed of the lathe-turning machining. Note that FIG. 16 is an image diagram according to the fourth embodiment.

Next, taking the machining program of FIG. 17 as an example, an operation example of inserting the circular motion to the lathe-turning machining with the numerical controller 10 according to the fourth embodiment will be described.

Figures 16, 17:
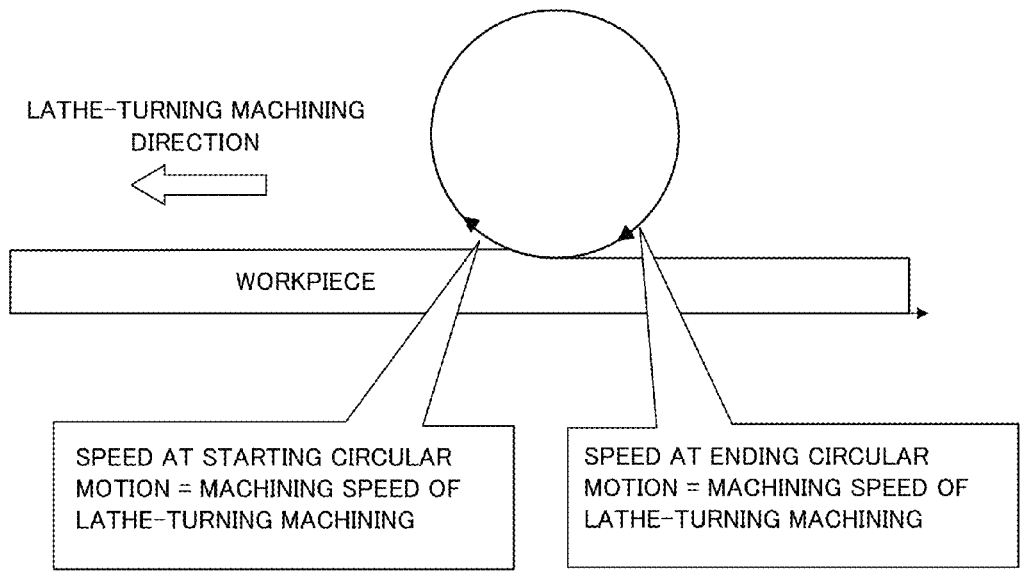
FIG. 16 is a diagram showing the operation of the circular motion according to a fourth embodiment of the present invention.
FIG. 17 is a diagram showing an example of a machining program according to the fourth embodiment of the present invention.

The machining program of FIG. 17 has the same instruction blocks as those of the machining program of FIG. 12 described in the second embodiment. Here, it is to be noted that the tangential speed of the circular motion set in the instruction of the N03 block differs from the machining speeds instructed in N05 and N06 blocks at which the lathe-turning machining operation for inserting the circular motion is instructed.

Based on the details of the respective blocks of the machining program of FIG. 17, the numerical controller according to the fourth embodiment controls the lathe-turning machine tool as follows.

(N01 block) The numerical controller sets the lathe-turning machine tool at the position of X45.0, Z200.0, and Y0.0.

(N02 block) The numerical controller rotates the main spindle clockwise at 500 rev/min.

(N03 block) The operation conditions for the circular motion are instructed to start the circular motion inserting function.

(N04 block) The numerical controller feeds the lathe-turning machine tool to the position of X50.0 at 1.5 mm/rev for cutting.

(N05 block) The numerical controller feeds the lathe-turning machine tool to the position of Z150.0 at 1.5 mm/rev for cutting. In addition, the numerical controller stops the movement of the axis based on the machining program at an interval of 5000 ms after the start of the N05 block with the circular motion inserting function, which has started at the N03 block, to insert the circular motion. Note that the speed of the circular motion is corrected into 1.5 mm/rev based on the machining speed of the lathe-turning machining instructed in this block.

(N06 block) The numerical controller feeds the lathe-turning machine tool to the position of Z100.0 at 0.5 mm/rev for cutting. In addition, the numerical controller also inserts the circular motion during the execution of the N06 block in succession to the N05 block. Note that the speed of the circular motion is corrected into 0.5 mm/rev based on the machining speed of the lathe-turning machining instructed in this block. When the N06 block comes to an end, the numerical controller stops inserting the circular motion.

(N07 block) The numerical controller feeds the lathe-turning machine tool to the position of X45.0 and Z80.0 at 1.5 mm/rev for cutting.

(N08 block) The numerical controller feeds the lathe-turning machine tool to the position of Z50.0 at 1.5 mm/rev for cutting.

(N09 block) The numerical controller feeds the lathe-turning machine tool to the position of X60.0 at 1.5 mm/rev for cutting.

As described above, since the tangential speed of the circular motion is corrected to coincide with the machining speed of the lathe-turning machining when the circular motion is inserted to the machining operation of the lathe-turning machining in the fourth embodiment, there is no likelihood that the cutting tool 46 and the workpiece 50 receive a shock or the machining accuracy of the workpiece 50 reduces.

Fifth Embodiment

A fifth embodiment will describe an example of a case in which the cutting in/out motion interferes with the machining path of the cutting machining when it is inserted.

In the above first embodiment, the cutting in/out motion is inserted to the machining operation of the lathe-turning machining. However, as shown in, for example, FIG. 18, there is a case that the cutting in/out motion interferes with the machining path of the lathe-turning machining immediately before a cutting feed direction changes. Therefore, when inserting the cutting in/out motion to the machining operation of the lathe-turning machining, the numerical controller 10 according to the fifth embodiment determines whether the cutting in/out motion interferes with the machining path of the lathe-turning machining and suspends the inserting of the cutting in/out motion, changes the cutting in/out amount, or changes the position at which the cutting in/out motion is inserted.

Figures 18, 19:
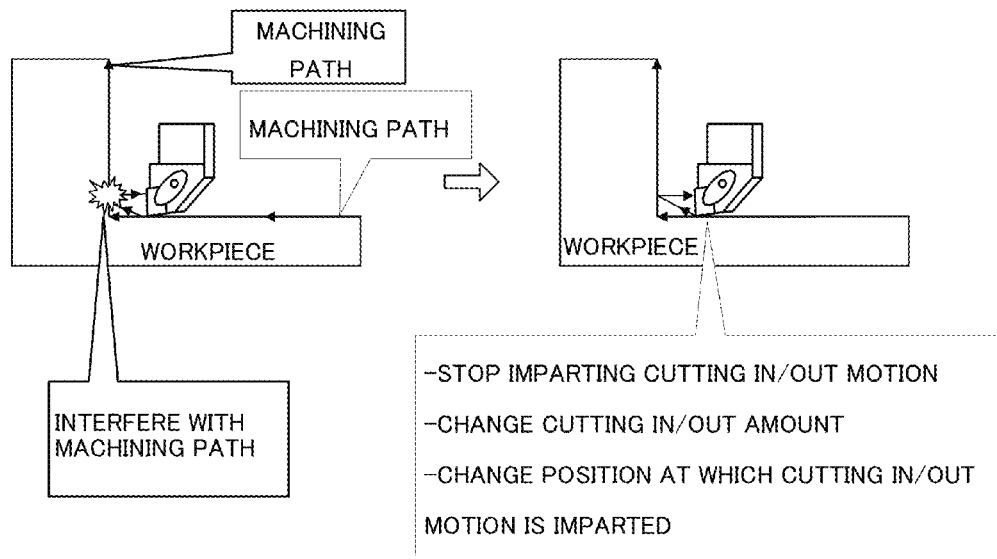
FIG. 18 is a diagram showing the operation of the cutting in/out motion according to a fifth embodiment of the present invention.
FIG. 19 is a diagram showing an example of a machining program according to the fifth embodiment of the present invention.

Next, taking the machining program of FIG. 19 as an example, an operation example of inserting the cutting in/out motion to the lathe-turning machining with the numerical controller 10 according to the third embodiment will be described.

Based on the details of the respective blocks of the machining program of FIG. 19, the numerical controller according to the third embodiment controls the lathe-turning machine tool as follows.

(N01 block) The numerical controller sets the lathe-turning machine tool at the position of X60.0, Z200.0, and Y0.0.

(N02 block) The numerical controller rotates the main spindle clockwise at 500 rev/min.

(N03 block) The operation conditions for the cutting in/out motion are instructed to start the cutting in/out motion inserting function.

(N04 block) The numerical controller feeds the lathe-turning machine tool to the position of X50.0 at 1.5 mm/rev for cutting.

(N05 block) The numerical controller feeds the lathe-turning machine tool to the position of Z100.0 at 1.5 mm/rev for cutting. In addition, the numerical controller stops the movement of the axis based on the machining program at an interval of 5000 ms after the start of the N05 block with the cutting in/out motion inserting function, which has started at the N03 block, to insert the cutting in/out motion. When the N05 block ends, the numerical controller stops inserting the cutting in/out motion.

(N06 block) The numerical controller feeds the lathe-turning machine tool to the position of X55.0 at 1.5 mm/rev for cutting.

(N07 block) The numerical controller feeds the lathe-turning machine tool to the position of Z50.0 at 1.5 mm/rev for cutting.

(N08 block) The numerical controller feeds the lathe-turning machine tool to the position of X60.0 at 1.5 mm/rev for cutting.

Figure 20:
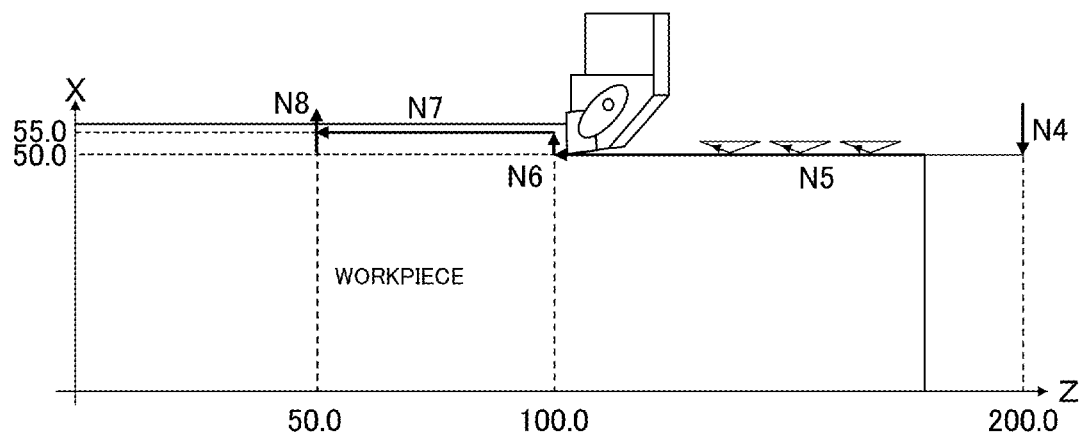
FIG. 20 is a diagram showing an operation example of the machining program according to the fifth embodiment of the present invention.

Here, as is clear from FIG. 20, the cutting in/out motion interferes with the machining path of the lathe-turning machining at the positions of Z200.0 to Z195.0 and Z105.0 to Z100.0 of the N05 block. Therefore, the numerical controller 10 performs any of the following control to prevent the cutting in/out motion from interfering with the machining path.

(Suspension of Inserting of Cutting in/Out Motion)

When it is determined that the cutting in/out motion interferes with the machining path of the lathe-turning machining, the numerical controller 10 suspends the inserting of the cutting in/out motion.

(Change in Cutting in/Out Amount of Cutting in/Out Motion)

When it is determined that the cutting in/out motion interferes with the machining path of the lathe-turning machining, the numerical controller 10 changes the cutting in/out amount of the cutting in/out motion to prevent the interference. Note that the minimum value of the cutting in/out amount is set at a parameter, an input signal, or a custom macro variable. In this way, it is also possible for the numerical controller to suspend the cutting in/out motion when changing the cutting in/out amount to the minimum value or less.

(Change in Position at which Cutting In/Out Motion is Inserted)

When it is determined that the cutting in/out motion interferes with the machining path of the lathe-turning machining, the numerical controller 10 changes the position at which the cutting in/out motion is inserted to a position at which the cutting in/out motion does not interfere with the machining path.

As described above, in the fifth embodiment, the numerical controller 10 automatically suspends the inserting of the cutting in/out motion, changes the cutting in/out amount, or changes the position at which the cutting in/out motion is inserted to prevent the cutting in/out motion from interfering with the machining path of the lathe-turning machining.

Therefore, the numerical controller 10 may continuously perform the lathe-turning machining without damaging the front surface of the workpiece 50.

Sixth Embodiment

A sixth embodiment will describe an example of a case in which the circular motion interferes with the machining path of the cutting machining when it is inserted.

In the above second embodiment, the circular motion is inserted to the machining operation of the lathe-turning machining. However, as shown in, for example, FIG. 21, there is a case that cutting in/out motion interferes with the machining path of the lathe-turning machining immediately before a cutting feed direction changes. Therefore, when inserting the circular motion to the machining operation of the lathe-turning machining, the numerical controller 10 according to the sixth embodiment determines whether the circular motion interferes with the machining path of the lathe-turning machining and suspends the inserting of the circular motion, changes the radius of the circular motion, or changes the position at which the circular motion is inserted.

Figures 21, 22:
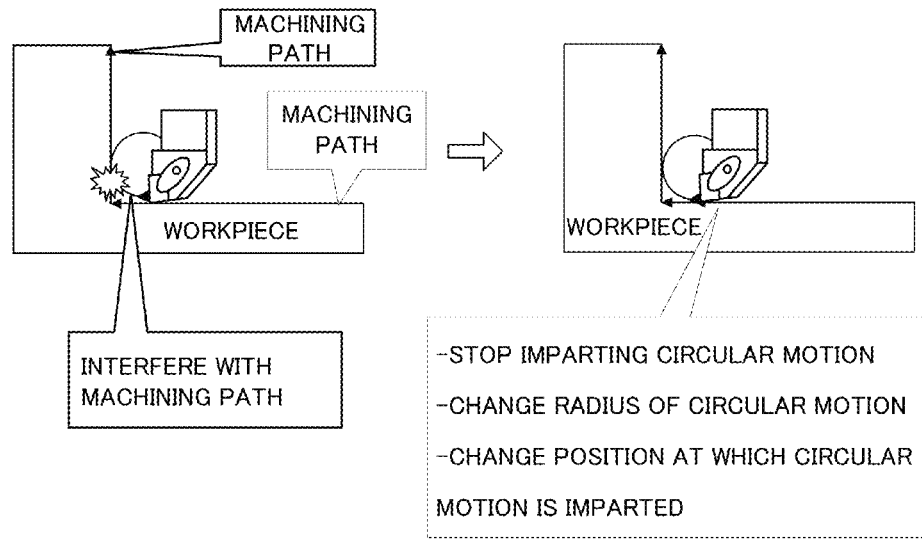
FIG. 21 is a diagram showing the operation of the circular motion according to a sixth embodiment of the present invention.
FIG. 22 is a diagram showing an example of a machining program according to the sixth embodiment of the present invention.

Next, taking the machining program of FIG. 22 as an example, an operation example of inserting the circular motion to the lathe-turning machining with the numerical controller 10 according to the sixth embodiment will be described.

Based on the details of the respective blocks of the machining program of FIG. 22, the numerical controller according to the sixth embodiment controls the lathe-turning machine tool as follows.

(N01 block) The numerical controller sets the lathe-turning machine tool at the position of X60.0, Z200.0, and Y0.0.

(N02 block) The numerical controller rotates the main spindle clockwise at 500 rev/min.

(N03 block) The operation conditions for the circular motion are instructed to start the circular motion inserting function.

(N04 block) The numerical controller feeds the lathe-turning machine tool to the position of X50.0 at 1.5 mm/rev for cutting.

(N05 block) The numerical controller feeds the lathe-turning machine tool to the position of Z100.0 at 1.5 mm/rev for cutting. In addition, the numerical controller stops the movement of the axis based on the machining program at an interval of 5000 ms after the start of the N05 block with the cutting in/out motion inserting function, which has started at the N03 block, to insert the circular motion. When the N05 block ends, the numerical controller stops inserting the circular motion.

(N06 block) The numerical controller feeds the lathe-turning machine tool to the position of X55.0 at 1.5 mm/rev for cutting.

(N07 block) The numerical controller feeds the lathe-turning machine tool to the position of Z50.0 at 1.5 mm/rev for cutting.

(N08 block) The numerical controller feeds the lathe-turning machine tool to the position of X60.0 at 1.5 mm/rev for cutting.

Figure 23:
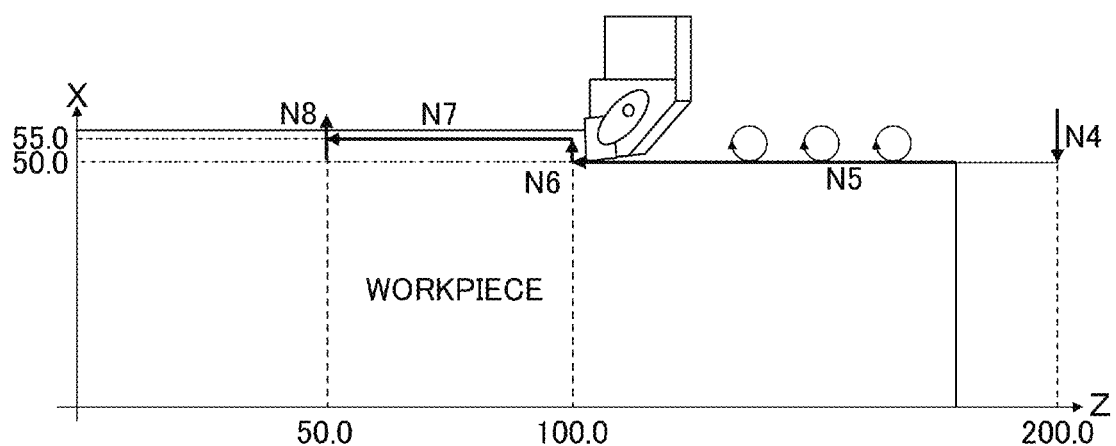
FIG. 23 is a diagram showing an example of the machining program according to the sixth embodiment of the present invention.

Here, as is clear from FIG. 23, the circular motion interferes with the machining path of the lathe-turning machining at the positions of Z200.0 to Z195.0 and Z105.0 to Z100.0 of the N05 block. Therefore, the numerical controller 10 performs any of the following control to prevent the circular motion from interfering with the machining path.

(Suspension of Inserting of Circular Motion)

When it is determined that the circular motion interferes with the machining path of the lathe-turning machining, the numerical controller 10 suspends the inserting of the circular motion.

(Change in Radius of Circular Motion)

When it is determined that the circular motion interferes with the machining path of the lathe-turning machining, the numerical controller 10 changes the radius of the cutting in/out motion to prevent the interference. Note that the minimum value of the radius of the circular motion is set at a parameter, an input signal, or a custom macro variable. In this way, it is also possible for the numerical controller 10 to suspend the circular motion when changing the radius of the circular motion to the minimum value or less.

(Change in Position at which Circular Motion is Inserted)

When it is determined that the circular motion interferes with the machining path of the lathe-turning machining, the numerical controller 10 changes the position at which the circular motion is inserted to a position at which the circular motion does not interfere with the machining path.

As described above, in the sixth embodiment, the numerical controller 10 automatically suspends the inserting of the circular motion, changes the radius of the circular motion, or changes the position at which the circular motion is inserted to prevent the circular motion from interfering with the machining path of the lathe-turning machining. Therefore, the numerical controller 10 may continuously perform the lathe-turning machining without damaging the front surface of the workpiece.

What is claimed is:

1. A numerical controller configured to control a machine tool according to a machining program, the machine tool performing lathe-turning machining in which a cutting tool moves in contact with a rotating workpiece to form the workpiece into a desired shape, the numerical controller comprising:

a cutting in and out motion operation conditions analysis unit configured to analyze operation conditions for cutting in and out motion instructed in the machining program; and a cutting in and out motion inserting unit configured to insert the cutting in and out motion that is generated based on the operation conditions analyzed by the cutting in and out motion operation conditions analysis unit into the lathe-turning machining, a cutting in and out motion execution flag exec_f represents whether the cutting in and out motion is being executed, and the cutting in and out motion is inserted to the cutting of the workpiece to allow the workpiece and the cutting tool to separate from each other to efficiently cool the cutting tool and address reduction of the service life of the cutting tool.

2. The numerical controller according to claim 1, wherein the cutting in and out motion inserting unit is configured to insert the cutting in and out motion, of which the cutting in and out speeds are the same as the feeding speed for cutting in the location where the cutting in and out motion is inserted during the lathe-turning machining, into the lathe-turning machining.

3. The numerical controller that has a cutting in and out motion inserting function according to claim 1, wherein when the inserted cutting in and out motion interferes with a machining path of the lathe-turning machining, the cutting in and out motion inserting unit is configured to suspend the inserting of the instruction of performing the cutting in and out motion, change a cutting in and out amount in the instruction of performing the cutting in and out motion, or change a position at which the instruction of performing the cutting in and out motion is inserted, to prevent the cutting in and out motion from interfering with the machining path.

* * * * *